US012399272B2

(12) United States Patent
Mehra et al.

(10) Patent No.: US 12,399,272 B2
(45) Date of Patent: Aug. 26, 2025

(54) MOTION CLASSIFICATION USING LOW-LEVEL DETECTIONS

(71) Applicant: Aptiv Technologies AG, Schaffhausen (CH)

(72) Inventors: Akshansh Mehra, Troy, MI (US); Fitsum Babu Mesadi, Troy, MI (US)

(73) Assignee: Aptiv Technologies AG, Schaffhausen (CH)

( * ) Notice: Subject to any disclaimer, the term of this patent is extended or adjusted under 35 U.S.C. 154(b) by 550 days.

(21) Appl. No.: 17/664,125

(22) Filed: May 19, 2022

(65) Prior Publication Data

US 2023/0013221 A1   Jan. 19, 2023

Related U.S. Application Data

(60) Provisional application No. 63/222,798, filed on Jul. 16, 2021.

(51) Int. Cl.
*G01S 13/931* (2020.01)
*G01S 13/52* (2006.01)
(Continued)

(52) U.S. Cl.
CPC ............ *G01S 13/931* (2013.01); *G01S 13/52* (2013.01); *G06V 10/809* (2022.01); *G06V 20/58* (2022.01); *G01S 2013/9323* (2020.01)

(58) Field of Classification Search
CPC ................... G01S 13/931; G01S 13/52; G01S 2013/9323; G01S 2013/93271;
(Continued)

(56) References Cited

U.S. PATENT DOCUMENTS

| 6,035,053 A | * | 3/2000 | Yoshioka | ........... B60K 31/0008 |
| | | | | 382/104 |
| 9,975,550 B2 | * | 5/2018 | Katoh | ............... B60W 30/0953 |
(Continued)

FOREIGN PATENT DOCUMENTS

CN    112130136 A   * 12/2020   ........... G01S 13/726

OTHER PUBLICATIONS

"Extended European Search Report", EP Application No. 22178708.8, Nov. 16, 2022, 11 pages.

*Primary Examiner* — Vladimir Magloire
*Assistant Examiner* — Bongani Jabulani Mashele
(74) *Attorney, Agent, or Firm* — Harness, Dickey & Pierce, P.L.C.

(57) ABSTRACT

Techniques and apparatuses are described that implement motion classification using low-level detections. In particular, a radar system identifies fused detections associated with an object and determines whether the fused detections indicate that the object is moving. If it is determined to be moving or moving perpendicular to the host vehicle, a current motion counter or perpendicular motion counter is incremented, respectively. A current motion flag and/or a perpendicular motion flag are set as true if the current motion counter or the perpendicular motion counter has a value greater than a threshold value, respectively. In response to setting either flag as true, the radar system increments a historical motion counter as true. The host vehicle is then operated based on the current motion flag, the perpendicular motion flag, and the historical motion counter. In this way, the radar system introduces hysteresis to improve the reliability and stability of motion classification.

18 Claims, 7 Drawing Sheets

(51) Int. Cl.
*G06V 10/80* (2022.01)
*G06V 20/58* (2022.01)

(58) Field of Classification Search
CPC ......... G01S 2013/93272; G01S 13/726; G01S 13/538; G01S 7/412; G01S 7/415; G01S 13/589; G01S 13/62; G01S 13/867; G01S 13/50; G01S 13/58; G06V 20/58; G06V 10/809; G06V 10/764; G06V 10/80
See application file for complete search history.

(56) References Cited

U.S. PATENT DOCUMENTS

| | | | |
|---|---|---|---|
| 2010/0191391 A1* | 7/2010 | Zeng | G01S 13/87 701/1 |
| 2014/0159948 A1* | 6/2014 | Ishimori | G01S 13/931 342/200 |
| 2015/0309172 A1* | 10/2015 | Mori | G01S 13/345 342/104 |

* cited by examiner

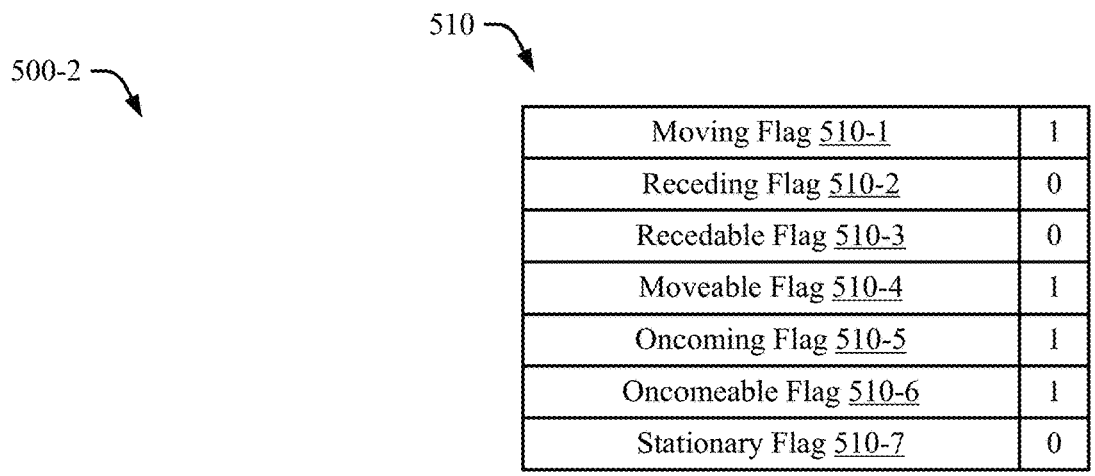
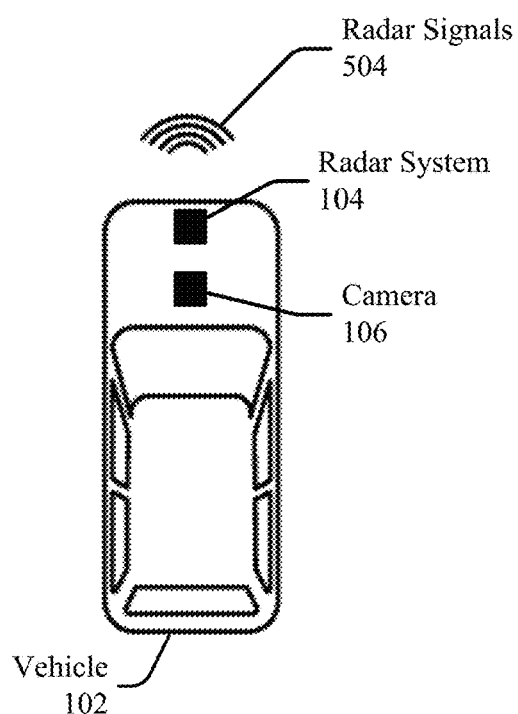
FIG. 5-2

MOTION CLASSIFICATION USING LOW-LEVEL DETECTIONS

CROSS-REFERENCE TO RELATED APPLICATION

This application claims the benefit under 35 U.S.C. 119(e) of U.S. Provisional Application No. 63/222,798, filed Jul. 16, 2021, the disclosure of which is hereby incorporated by reference in its entirety herein.

BACKGROUND

Advances in autonomous driving can lead to the ubiquitous use of self-driving cars and autonomous robots in business and everyday life. Many autonomous-driving techniques rely on information provided by one or more sensors to visualize a surrounding environment. With this information, autonomous-driving logic can recognize the presence (or absence) of objects and their current positions and velocities. Even with this information, however, it can be challenging for the autonomous-driving logic to determine an appropriate action that provides a sufficient margin of safety for avoiding a collision.

The autonomous-driving logic can determine the appropriate action based on whether the object is stationary or moving and a correct estimation of the object's orientation or heading. In some instances, the time available for determining the appropriate action can be short, and in that time, the sensors may fail to obtain sufficient observations of the object to determine its motion classification and accurately predict future movements. It can be challenging for the sensors to classify the object quickly and accurately for enabling autonomous-driving applications.

SUMMARY

Techniques and apparatuses are described that implement motion classification using low-level detections. In particular, a radar system, which is mounted to a moving platform, extracts detections associated with an object based on radar data. The radar system identifies fused detections among the detections that are associated with a particular object and determines whether the fused detections indicate that the particular object is moving. In response to determining that the fused detections indicate that the particular object is moving, the radar system increments a current motion counter for the particular object. The radar system also increments a perpendicular motion counter in response to determining that the fused detections indicate that the particular object is moving perpendicular to the host vehicle. The radar system then sets a current motion flag and/or a perpendicular motion flag as true in response to determining that the current motion counter or the perpendicular motion counter has a value greater than a threshold value, respectively. In response to setting either flag as true, the radar system increments a historical motion counter for the particular object as true. The host vehicle is then operated based on the current motion flag, the perpendicular motion flag, and the historical motion counter. In this way, the radar system introduces hysteresis in its motion classification to provide a reliable and stable motion classification output to downstream vehicle-based systems. The described radar system can also introduce flag reset mechanisms to prevent false positives and erroneous vehicle operation reactions.

This document also describes methods performed by the above-summarized radar system and other configurations of the radar system set forth herein and means for performing these methods.

This Summary introduces simplified concepts related to motion classification using low-level detections, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of motion classification using low-level detections are described in this document with reference to the following figures. The same numbers are used throughout the drawings to reference like features and components:

FIGS. 4-1 and 4-2 illustrate an example conceptual diagram for performing motion classification using low-level detections; and FIGS. 5-1 and 5-2 illustrate conceptual diagrams in which motion classification is performed using low-level detections.

DETAILED DESCRIPTION

Overview

Figure 1:
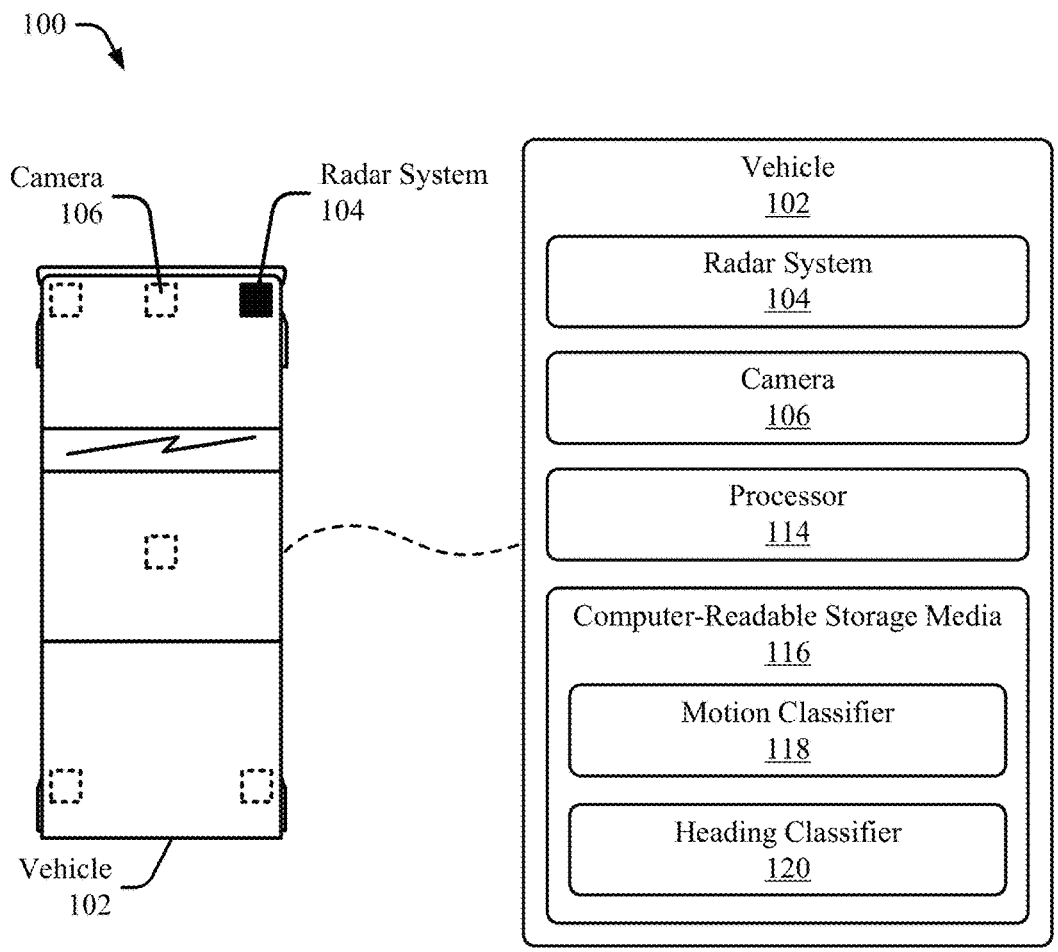
FIG. 1 illustrates an example environment in which a radar system capable of performing motion classification using low-level detections can be implemented in accordance with the techniques of this disclosure.
Figure 1:
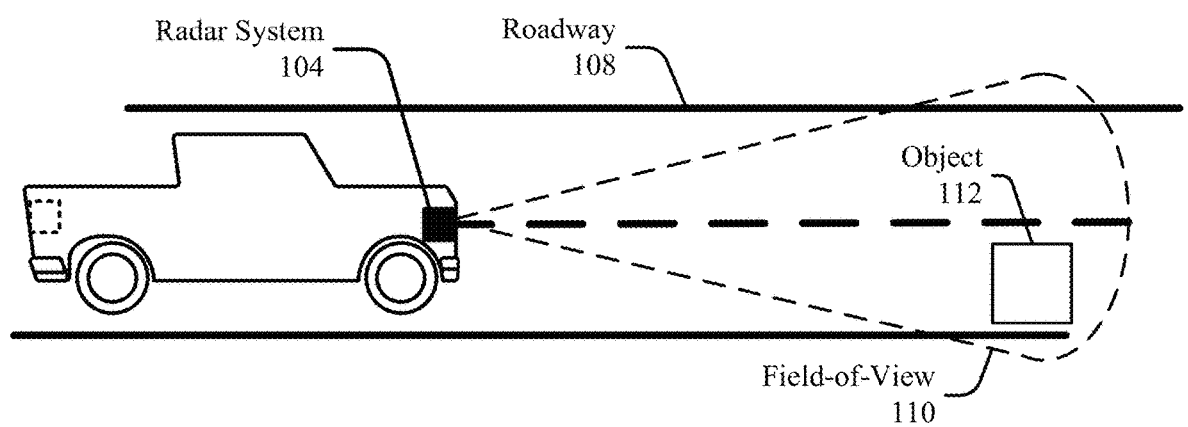

Many assisted-driving and autonomous-driving applications rely on information from sensors (e.g., radar sensors, cameras) to visualize a surrounding environment. Correct classification of objects (e.g., stationary, moving) and estimation of the movement heading (e.g., cross-traffic, receding, oncoming) are necessary elements of many assisted-driving and autonomous-driving applications. These applications often use a multi-sensor architecture (e.g., a combination of radar sensors and cameras) to provide improved motion classification and heading for nearby objects, enabling driving decisions with a greater degree of confidence.

Sensors in a multi-sensor architecture have relative strengths and weaknesses. For example, radar sensors can provide improved performance in the presence of different environmental conditions, such as low lighting and fog, or with moving or overlapping objects. Radar sensors can also provide accurate range and range-rate estimations of objects in the environment. In contrast, cameras can provide improved identification of objects (e.g., identifying vulnerable road users (VRUs) like pedestrians and bicyclists) and azimuth angle estimations. In particular, cameras can determine the motion and orientation states of cross-moving objects with a higher degree of precision than radar sensors.

To correctly classify the motion classification and heading of objects, multi-sensor systems should utilize a computationally-efficient algorithm with a high degree of confidence. Some multi-sensor systems use a speed-based determination to classify object motion. For example, these systems can determine whether any tracklets or fused objects associated with a target satisfy threshold criteria and mark a corresponding flag accordingly. If an object is determined to be moving, then the systems can determine whether the object is moving away or toward the host vehicle.

Because the sensors can often detect negligible velocity components associated with stationary objects, these systems can find it difficult to differentiate slow-moving objects from stationary objects. Similarly, it can be difficult for these systems to track the motion states of objects in urban driving environments where objects can repeatedly toggle between moving and stationary. These systems can also struggle to correctly classify objects across a range of object types (e.g., pedestrians versus vehicles).

In contrast, this document describes techniques that perform motion classification and heading determination more robustly and accurately. For example, the described system can directly use sensor data to reduce noise output and overprocessing. The system can use camera data to identify the type of object and dynamically apply the corresponding threshold to classify its motion more accurately. Hysteresis techniques are used to provide stable motion and heading classifications, especially for urban environments and slow-moving objects. In this way, the described system provides a more reliable and stable motion and heading classification for all types of objects with different headings and orientations. The system also utilizes reset mechanisms to reduce false positives and avoid erroneous reactions by assisted-driving and autonomous-driving applications.

Example Environment

FIG. 1 illustrates an example environment 100 in which a radar system 104 capable of performing motion classification using low-level detections can be implemented in accordance with the techniques of this disclosure. In the depicted environment 100, the radar system 104 is mounted to, or integrated within, a vehicle 102. The radar system 104 is capable of detecting one or more objects 112 that are within proximity of the vehicle 102 by transmitting and receiving electromagnetic (EM) signals. The vehicle 102 can also include a camera 106 (or vision system) configured to capture vision data regarding the objects 112.

Although illustrated as a truck, the vehicle 102 can represent other types of motorized vehicles (e.g., a car, a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In general, the radar system 104 and the camera 106 can be mounted to any type of moving platform, including moving machinery or robotic equipment.

In the depicted implementation, the radar system 104 and the camera 106 are mounted near the front of the vehicle 102 and each provides an instrumental field of view 110. In other implementations, the radar system 104 and the camera 106 can be mounted to the backside, left side, or right side of the vehicle 102. In some cases, the vehicle 102 includes multiple radar systems 104 (or cameras 106), such as a first front-mounted radar system 104 positioned near the left side of the vehicle 102 and a second front-mounted radar system 104 positioned near the right side of the vehicle 102. In general, locations of the radar systems 104 and cameras 106 can be designed to provide a particular field of view 110 that encompasses a region of interest in which the object 112 may be present. Example fields of view 110 include a 360-degree field of view, one or more 180-degree fields of view, one or more 90-degree fields of view, and so forth, which can overlap (e.g., four 120-degree fields of view).

The radar system 104 can include at least one antenna array and at least one transceiver to transmit and receive radar signals. The antenna array includes at least one transmit antenna element and at least one receive antenna element. In some situations, the antenna array includes multiple transmit antenna elements and multiple receive antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

Using the antenna array, the radar system 104 can form beams that are steered or un-steered and wide or narrow. The steering and shaping can be achieved through analog beamforming or digital beamforming. The transmitting antenna elements can have, for instance, an un-steered omnidirectional radiation pattern or can produce a wide steerable beam to illuminate a large volume of space. To achieve target angular accuracies and angular resolutions, the receiving antenna elements can be used to generate hundreds of narrow steered beams with digital beamforming. In this way, the radar system 104 can efficiently monitor an external environment and detect one or more objects 112 within the field-of-view 110.

The transceiver includes circuitry and logic for transmitting and receiving radar signals via the antenna array. Components of the transceiver can include amplifiers, mixers, switches, analog-to-digital converters, or filters for conditioning the radar signals. The transceiver also includes logic to perform in-phase/quadrature (I/Q) operations, such as modulation or demodulation. A variety of modulations can be used, including linear frequency modulations, triangular frequency modulations, stepped frequency modulations, or phase modulations. The transceiver can be configured to support continuous-wave or pulsed radar operations. A frequency spectrum (e.g., range of frequencies) that the transceiver uses to generate the radar signals can encompass frequencies between one and four hundred gigahertz (GHz), between four and one hundred GHz, or between approximately seventy and eighty GHz. The transceiver can employ a spread spectrum technique, such as code-division multiple access (CDMA), to support MIMO operations.

In general, the object 112 is composed of one or more materials that reflect radar signals. The object 112 can be a non-living object, such as a four-wheel vehicle or a two-wheel vehicle. In other cases, the object 112 is a living object, such as a pedestrian or an animal. The objects 112 can be moving or stationary. If moving, the objects 112 can be moving perpendicular and/or parallel with the travel path of the vehicle 102. Other types of objects 112 can include a continuous or discontinuous road barrier, a traffic cone, a concrete barrier, a guard rail, a fence, or a tree.

Information regarding the object type, its motion classification, and its heading that is detected by the radar system 104 and/or the camera 106 can enable an assisted-driving or autonomous-driving application of the vehicle 102 to determine an appropriate action to avoid a potential collision with the object 112. Example actions can include braking to stop, veering, or reducing speed. In particular, the object type can indicate an appropriate speed threshold for classifying the motion of the object 112 (e.g., moving, stationary). Based on this information, the assisted-driving or autonomous-driving application can determine an appropriate safety margin (e.g., an appropriate distance and/or speed) to maintain while approaching the object 112 in order to reserve adequate time to avoid a potential collision.

The vehicle 102 also includes a processor 114 (e.g., a hardware processor, a processing unit) and computer-readable storage media (CRM) 116 (e.g., a memory, long-term storage, short-term storage) that stores computer-executable instructions for a motion classifier 118 and a heading classifier 120. The processor 114 can include multiple processing units or a single processing unit (e.g., a microprocessor). The processor 114 can also be a system-on-chip of a computing device, a controller, or an electronic control unit. The processor 114 executes computer-executable instructions stored within the CRM 116. As an example, the processor 114 can execute the motion classifier 118 to classify the motion of the object 112 as moving or stationary and maintain a history of the object's motion classification. Similarly, when the heading classifier 120 is executed by the processor 114, a heading (e.g., cross-traffic, oncoming, receding) of the object 112 can be determined relative to the vehicle 102. The motion classifier 118 can directly use data from the radar system 104 and the camera 106 to reduce overprocessing by the vehicle 102 and/or the processor 114 and noise from the motion classifications.

Example System

Figure 2:
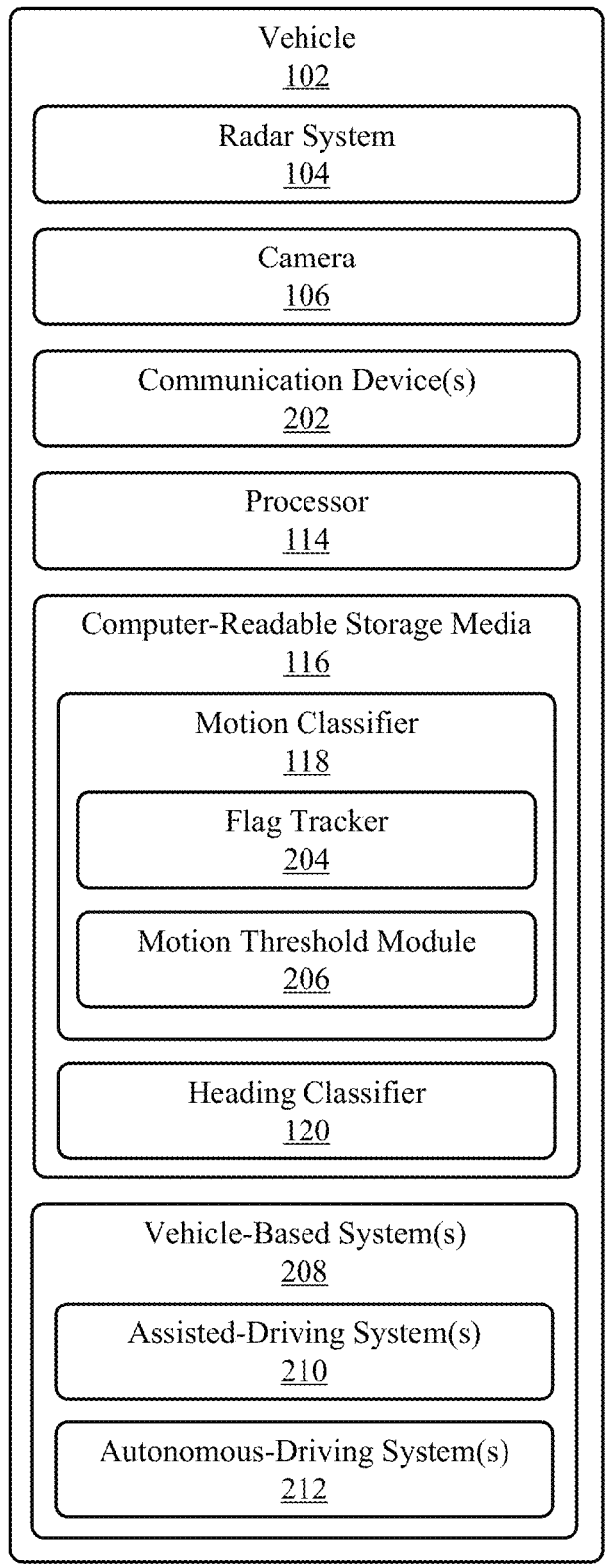
FIG. 2 illustrates an example configuration of a vehicle with a radar system that performs motion classification using low-level detections.

FIG. 2 illustrates an example configuration of the vehicle 102 with the radar system 104 that can perform motion classification using low-level detections. As described with respect to FIG. 1, the vehicle 102 can include the radar system 104, the camera 106, the processor 114, the CRM 116, the motion classifier 118, and the heading classifier 120. The vehicle 102 can also include one or more communication devices 202 and one or more vehicle-based systems 208.

The communication devices 202 can include a sensor interface and a vehicle-based system interface. The sensor interface and the vehicle-based system interface can transmit data over a communication bus of the vehicle 102, for example, when the individual components of the motion classifier 118 and the heading classifier 120 are integrated within the vehicle 102. The communication devices 202 can provide raw or processed sensor data from the radar system 104 and the camera 106 to the motion classifier 118 and the heading classifier 120.

The motion classifier 118 can include a flag tracker 204 and a motion threshold module 206. The flag tracker 204 can provide historical tracking of flags and counters associated with the movement and/or heading associated with individual objects 112. For example, the flag tracker 204 can maintain both instantaneous and historical flag data for different motion and heading classifications (e.g., moving, receding, moveable, oncoming, and/or stationary flags) associated with the objects 112. In this way, the motion classifier 118 can avoid inconsistent or flickering motion classifications for a particular object, especially in urban or congested driving environments, by introducing hysteresis into the motion tracking. In addition, the described techniques decrease the occurrence of false positives in identifying a particular object as moving or stationary.

The motion threshold module 206 can use vision data from the camera 106 to determine an object type for each object 112. Based on the object type, the motion threshold module 206 can use different motion thresholds to classify a particular object 112 as moving or stationary. In this way, the motion classifier 118 can adjust motion thresholds based on the type of object detected and provide improved motion and heading classifications for the objects 112. For example, the motion threshold module 206 can use a reduced motion threshold for pedestrians to account for the uncertainty and ambiguity inherent in recognizing motion patterns for pedestrians and other VRUs.

The vehicle 102 also includes the vehicle-based systems 208, such as an assisted-driving system 210 and an autonomous-driving system 212, that rely on data from the motion classifier 118 and/or the heading classifier 120 to control the operation of the vehicle 102 (e.g., braking, lane changing). Generally, the vehicle-based systems 208 can use data provided by the motion classifier 118 and/or the heading classifier 120 to control operations of the vehicle 102 and perform certain functions. For example, the assisted-driving system 210 can output information (e.g., a message, a sound, a visual indicator) to alert a driver of a stationary object and perform evasive maneuvers to avoid a collision with the stationary object. As another example, the autonomous-driving system 212 can navigate the vehicle 102 to a particular location to avoid a collision with a moving object.

Example Methods

Figure 3:
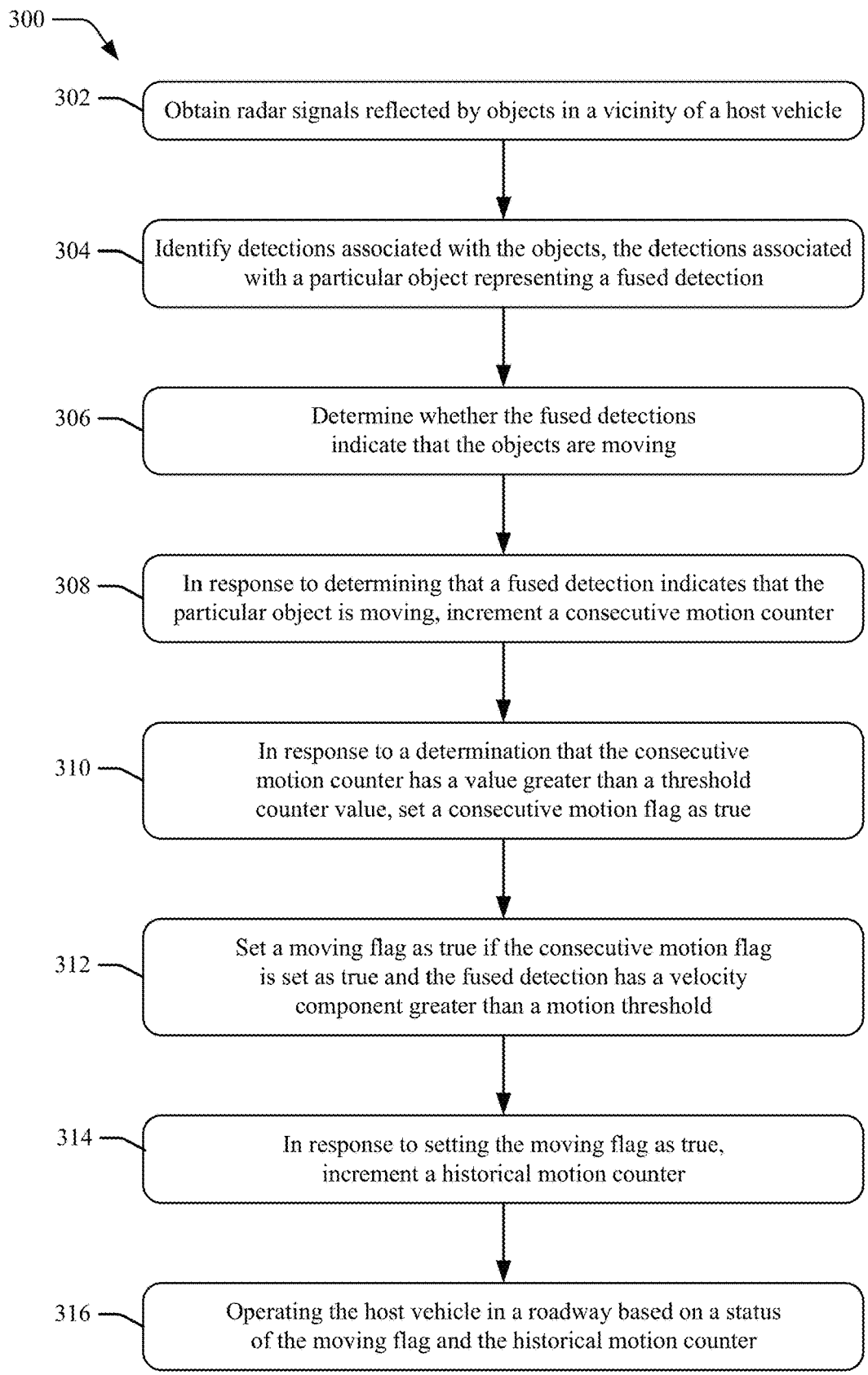
FIG. 3 illustrates an example method to perform motion classification using low-level detections.

FIG. 3 illustrates an example method 300 to perform motion classification using low-level detections. Method 300 is shown as sets of numbered operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 1 and 2, reference to which is made for example only. The techniques are not limited to performance by one entity or multiple entities.

At 302, radar signals are obtained from a radar system for a data cycle. The radar signals are reflected by one or more objects in a vicinity of a host vehicle. For example, the radar system 104 may be installed in the vehicle 102 and provides a field-of-view 110 of the roadway 108. The radar system 104 transmits and receives radar signals, including radar signals reflected by the objects 112 that in the environment 100 around the vehicle 102.

At 304, one or more detections associated with each of the one or more objects are identified using the radar signals. The detections associated with a particular object of the one or more objects represent a fused detection for the particular object. For example, the processor 114 or the radar system 104 can determine, using the radar signals, detections associated with the objects 112. The processor 114 or the radar system 104 can relate detections associated with a particular object 112 as a fused detection for that particular object 112. In this way, the processor 114 or the radar system 104 can provide fused detections to the motion classifier 118 for each of the objects 112.

At 306, for each fused detection, it is determined whether the fused detection indicates that the particular object is moving. For example, the motion classifier 118 can determine, for each fused detection, whether a particular fused detection indicates that the particular object 112 associated with that fused detection is moving. The motion classifier 118 can determine a particular object 112 is moving if at least half of the detections associated with that particular object 112 indicate movement. If less than half of the detections associated with the particular object 112 indicate movement, then the motion classifier 118 can determine that movement is ambiguous.

The motion classifier 118 can also determine, for each fused detection, whether the fused detection indicates that the particular object 112 is moving perpendicular (e.g., has an orthogonal velocity component) to the vehicle 102. The motion classifier 118 can determine perpendicular movement by determining that the orthogonal velocity component associated with the fused detection is greater than zero.

Method 300 includes performing operations 306 through 314 for each fused detection (associated with each object 112) in each data cycle (or fused data cycle). Although the operations 306 through 314 may be written in the singular for a particular fused detection or particular object, it should be understood that the operations 306 through 314 are performed for each fused detection of each data cycle.

At 308, in response to determining that the fused detection indicates that the particular object is moving, a consecutive motion counter associated with the particular object is incremented. For example, the motion classifier 118 can increment (e.g., increase a value by one) a consecutive motion counter associated with the particular object 112 in response to determining that the fused detection indicates that the object 112 is moving. Similarly, the motion classifier 118 can increment a consecutive ambiguity counter associated with the particular object 112 in response to determining that movement of the object 112 is ambiguous. In response to incrementing the consecutive ambiguity counter associated with the particular object 112, the motion classifier 118 can reset a value of the consecutive motion counter associated with the particular object 112 to zero. Similarly, in response to incrementing the consecutive motion counter associated with the particular object 112, the motion classifier 118 can reset a value of the consecutive ambiguity counter associated with the particular object 112 to zero. The motion classifier 118 can also increment a consecutive perpendicular motion counter associated with the particular object 112 in response to determining that the fused detection indicates that the object 112 is moving perpendicular to the vehicle 102.

At 310, a consecutive motion flag associated with the particular object is set as true in response to determining that the consecutive motion counter associated with the particular object has a value greater than a threshold counter value. For example, the motion classifier 118 can set a consecutive motion flag associated with the particular object as true in response to determining that the consecutive motion counter associated with the particular object 112 has a value greater than a threshold counter value (e.g., having a value of three). Similarly, the motion classifier 118 can set a consecutive perpendicular motion flag associated with the particular object 112 as true in response to determining that the consecutive perpendicular motion counter has a value greater than the threshold counter value.

At 312, a moving flag associated with the particular object is set as true if the consecutive motion flag associated with the particular object is set as true and the fused detection associated with the particular object has a velocity component greater than a motion threshold. For example, the motion classifier 118 can set a moving flag associated with the particular object 112 as true if the consecutive motion flag associated with the object 112 is set as true and the fused detection associated with the object 112 has a velocity component (e.g., a longitudinal velocity component) greater than a motion threshold. The motion classifier 118 can determine if the fused detection associated with the particular object 112 has a longitudinal velocity component greater than the motion threshold by first determining a corresponding motion threshold. In particular, the motion classifier 118 can determine, for each fused detection and using vision data from the camera 106, an object type (e.g., pedestrian, vehicle, bicyclist) of the particular object 112. The motion classifier 118 can then set the motion threshold based on the object type of the particular object 112 as described in greater detail with respect to FIGS. 4-1 and 4-2.

The motion classifier 118 can compare the longitudinal velocity component associated with the particular object 112 to this motion threshold. This comparison can be performed by first comparing a radar longitudinal velocity component associated with the particular object 112 to the motion threshold. The radar longitudinal velocity component is obtained from the radar signals. If the radar data is insufficient to make this comparison, the motion classifier 118 can then compare a vision velocity component associated with the particular object 112 to the motion threshold. The vision longitudinal velocity component is obtained from the vision data. If neither the radar data nor vision data can support this comparison, then the motion classifier 118 can use a previous state of the moving flag associated with the particular object 112 determined during the previous data cycle. To reduce processing requirements, the motion classifier 118 can determine whether the fused detection associated with the particular object 112 has a longitudinal velocity component greater than a clearly moving threshold. If the velocity component is greater than this clearly moving threshold, the motion classifier 118 need not compare the radar or vision data to the motion threshold.

Similarly, the motion classifier 118 can set the moving flag associated with the particular object 112 as true if the consecutive perpendicular motion flag associated with the object 112 is set as true and the fused detection associated with the object 112 has an orthogonal velocity component greater than a perpendicular motion threshold. The perpendicular motion threshold can be set based on the object type of the particular object 112. The motion classifier 118 can determine that the orthogonal velocity component of the fused detection is greater than the perpendicular motion threshold by determining that a radar orthogonal velocity component of the fused detection based on the radar signals is greater than the perpendicular motion threshold. Or the motion classifier 118 can determine that a vision orthogonal velocity component of the fused detection based on the vision data is greater than the perpendicular motion threshold. If the motion classifier 118 determines that the orthogonal velocity component associated with the fused detection is not greater zero (e.g., no perpendicular motion detected for that data cycle), it can reduce the value of the consecutive perpendicular motion counter associated with the particular object 112 by one, as opposed to resetting its value to zero.

If the moving flag associated with the particular object is set as true, the heading classifier 120 can then determine a heading classification (e.g., crossing, east, west, northeast, etc.) associated with the particular object from a heading associated with the fused detection. If the heading classification associated with the particular object is one that indicates perpendicular movement relative to the vehicle 102, the heading classifier 120 can set a crossing flag as true.

At 314, in response to setting the moving flag associated with the particular object as true, a historical motion counter associated with the particular object is incremented for each fused detection. For example, the motion classifier 118 can increment a historical motion counter associated with the particular object 112 if its moving flag is set as true. The motion classifier 118 can also set a moveable flag associated with the particular object 112 as true if the moving flag associated with the particular object 112 is true. The moveable flag indicates whether the moving flag associated with the particular object 112 has been set as true in this data cycle or any previous data cycle. The motion classifier 118 can also reset the moveable flag associated with the particular object 112 to false if the historical motion counter associated with the object 112 has a value less than ten.

At 316, the host vehicle is operated in the roadway based on a status of the moving flag and the historical motion counter associated with each of the one or more objects. For example, the assisted-driving system 210 or the autonomous-driving system 212 can operate the vehicle 102 based on a status of the moving flag and the historical motion counter associated with each of the objects 112. The assisted-driving system 210 or the autonomous-driving system 212 can also operate the vehicle 102 based on a status of the crossing flag and/or the moveable flag associated with each of the objects 112.

Figures 1, 4:
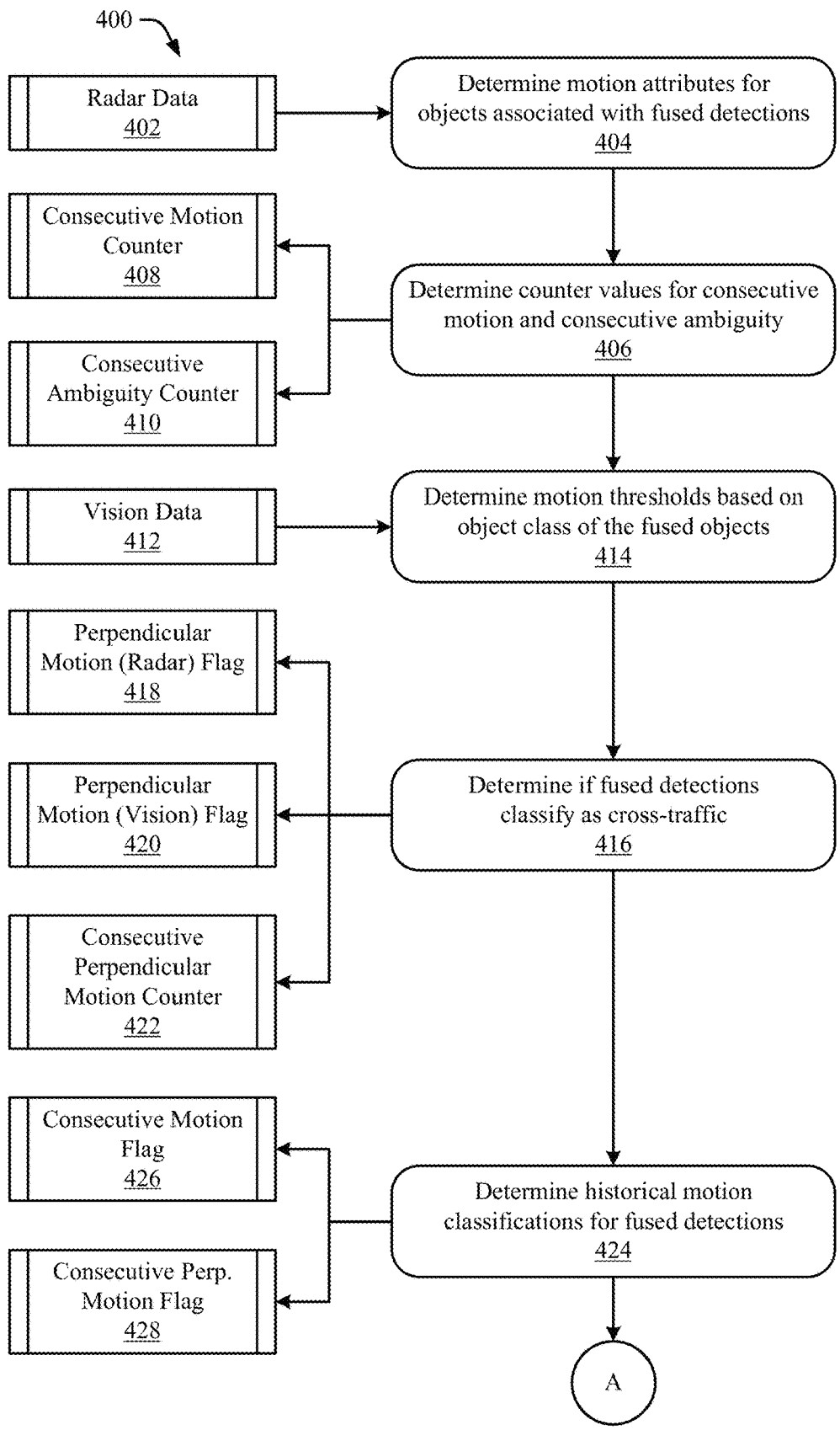
Figures 2, 4:
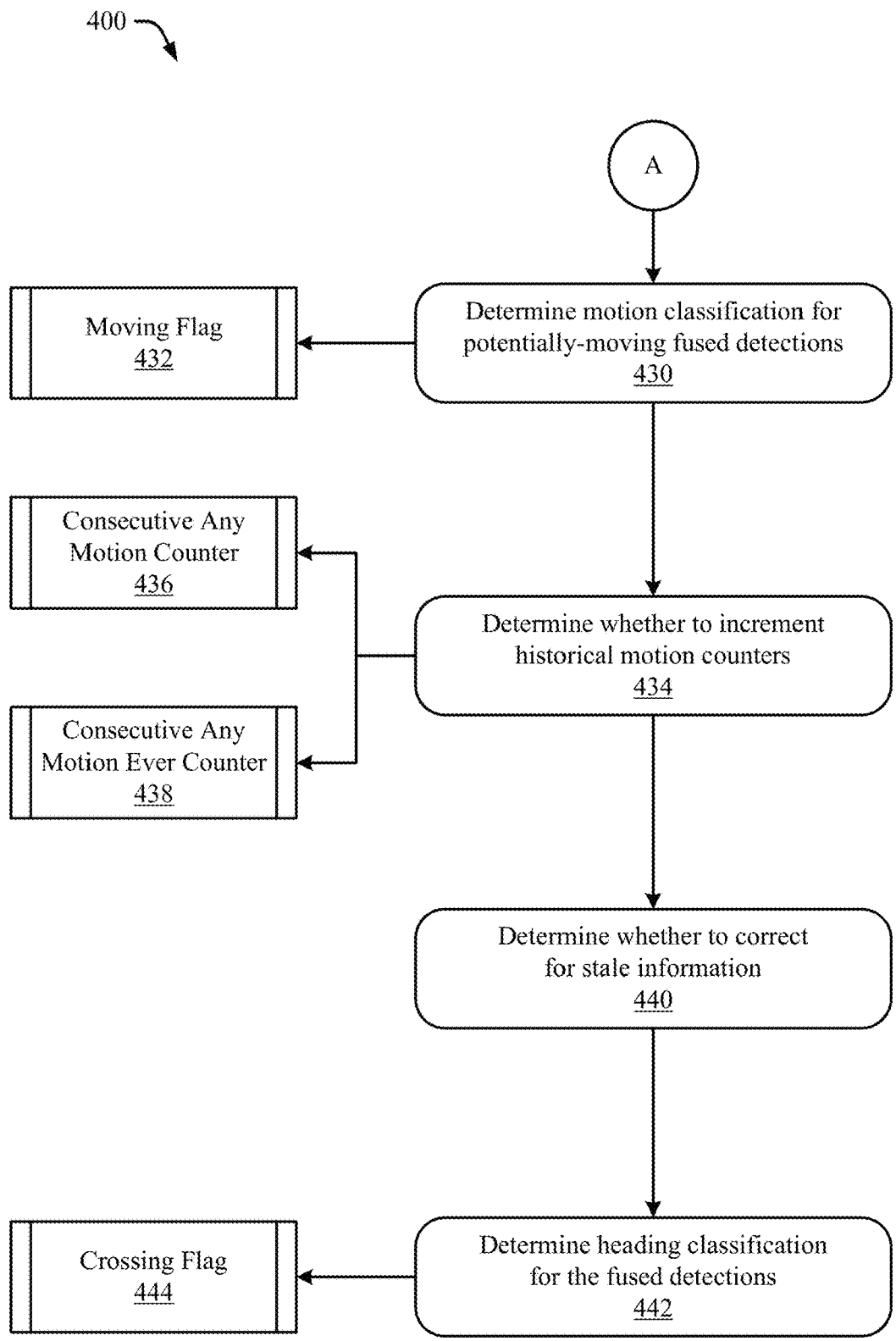

FIGS. 4-1 and 4-2 illustrate an example conceptual diagram 400 for performing motion classification using low-level detections. In particular, the conceptual diagram 400 illustrates the motion classification process of the motion classifier 118 and the heading classification process of the heading classifier 120. The conceptual diagram 400 illustrates example inputs, outputs, and operations of the motion classifier 118 and the heading classifier 120, but the motion classifier 118 and the heading classifier 120 are not necessarily limited to the order or combinations in which the inputs, outputs, and operations are shown herein. Further, any of one or more of the operations may be repeated, combined, or reorganized to provide other functionality.

At operation 404, the motion classifier 118 determines motion attributes for objects 112 associated with fused detections. The motion classifier 118 receives radar data 402 from the one or more radar systems 104. The radar data 402 can be at the detection level and include one or more detections associated with each of the objects 112 within the field-of-view 110 of the radar system 104. Multiple detections associated with a particular object 112 can represent a fused detection (or "a fused object"). The motion classifier 118 determines the number or percentage of radar detections associated with each fused detection indicate that the particular object 112 is moving.

At operation 406, the motion classifier 118 determines counter values for consecutive motion and consecutive ambiguity. In particular, the motion classifier 118 determines a value for a consecutive motion counter 408 (e.g., "cntConsecutiveMoving") and a consecutive ambiguity counter 410 (e.g., "cntConsecutiveAmbiguous"). For each frame of radar data, the motion classifier 118 can classify the fused detection associated with each object 112 as moving or ambiguous. For example, if more than fifty percent of the radar detections associated with the fused detection indicate that the particular object 112 is moving, the consecutive motion counter 408 is incremented linearly. The consecutive motion counter 408 can have a maximum value of one hundred. The motion classifier 118 can use a different percentage threshold to classify each fused detection as moving or ambiguous in other implementations. If the consecutive motion counter 408 is incremented, the motion classifier 118 reinitializes the consecutive ambiguity counter 410 to zero.

Similarly, if less than fifty percent of the radar detections associated with the fused detection indicate that the particular object 112 is moving, the consecutive ambiguity counter 410 is incremented linearly. The consecutive ambiguity counter 410 can also have a maximum value (e.g., one hundred). If the consecutive ambiguity counter 410 is incremented, the motion classifier 118 reinitializes the consecutive motion counter 408 to zero. The motion classifier 118 stores the historical values of the consecutive motion counter 408 and the consecutive ambiguity counter 410 for each object 112.

At operation 414, the motion classifier 118 determines motion thresholds for the fused detections based on an object class of a particular object 112. In particular, the motion classifier 118 can account for the uncertainty in VRU movements and the difficulty in recognizing their motion patterns by using lower threshold values to determine their motion classification. For example, the motion classifier 118 can use a default minimum moving speed of 1.0 meters/second (m/s) as a motion threshold to classify an object 112 as moving. A motion threshold of 0.5 m/s can be used to classify a pedestrian as moving. The motion classifier 118 can use vision data 412 to identify a particular object 112 as a pedestrian. The vision data 412 can be image data from the camera 106.

Similarly, the motion classifier 118 can use different cross-direction (e.g., perpendicular) motion thresholds based on the object type associated with each fused detection. For example, a vehicle can be classified as having perpendicular motion using a perpendicular motion threshold of 2.0 m/s. In contrast, a pedestrian can be classified as moving perpendicular to the vehicle 102 using a perpendicular motion threshold of 1.0 m/s.

At operation 416, the motion classifier 118 determines whether the fused detections can be classified as cross-traffic. The motion classifier 118 can use the radar data 402 to determine radial and orthogonal velocities for each fused detection and its heading, which are then used to determine a cross-traffic motion status for each object 112 for each data cycle. Based on the appropriate perpendicular motion threshold, the motion classifier 118 determines whether to set a perpendicular motion (radar) flag 418 (e.g., "f_cur_p-erp_motion") as true. The perpendicular motion (radar) flag 418 is a Boolean flag.

Similarly, the motion classifier 118 can use the vision data 412 to determine radial and orthogonal velocities for each fused detection and its heading. Based on the appropriate perpendicular motion threshold, the motion classifier 118 determines whether to set a perpendicular motion (vision) flag 420 (e.g., "f_vis_data_perp_motion") as true. The perpendicular motion (vision) flag 420 is also a Boolean flag and allows the motion classifier 118 to add redundancy to the motion classification by discretely including the vision data 412. This redundancy in the perpendicular motion classification adds robustness to the motion classification algorithm of the motion classifier 118.

The motion classifier 118 also tracks the cyclical history of the perpendicular motion classification for each fused detection using a consecutive perpendicular motion counter 422 (e.g., "cntConsecutivePerp"). The consecutive perpendicular motion counter 422 is incremented by one if either the perpendicular motion (radar) flag 418 or the perpendicular motion (vision) flag 420 are true for the fused detection for that data cycle. The consecutive perpendicular motion counter 422 can have a maximum value of twenty. The motion classifier 118 stores the historical values of the consecutive perpendicular motion counter 422 for each object 112.

At operation 424, the motion classifier 118 determines historical motion classifications for each fused detection. If the consecutive motion counter 408 for a fused detection has a value greater than or equal to three, the particular object 112 is determined to have motion at that data cycle and a consecutive motion flag 426 (e.g., "f_ConsecutiveMoving_ok") is marked as true for that data cycle. The motion classifier 118 can use a different value than three to determine the state value of the consecutive motion flag 426 in other implementations.

Similarly, if the consecutive perpendicular motion counter 422 for a fused detection has a value greater than or equal to three, the particular object 112 is determined to have perpendicular motion at that data cycle and a consecutive perpendicular motion flag 428 (e.g., "f_perp_motion") is marked as true for that data cycle. The motion classifier 118 can use a different value than three to determine the state value of the consecutive perpendicular motion flag 428 in other implementations. To account for the difficulty in detecting perpendicular motion, the consecutive perpendicular motion counter 422 can be linearly reduced. The linear reduction of the consecutive perpendicular motion counter 422 can avoid erratic driving operations from the vehicle-based systems 208 that would be caused by an immediate drop in the counter value.

At operation 430, the motion classifier 118 determines motion classification for potentially-moving fused detections. If the speed for a fused detection is above a clearly moving threshold (e.g., 4 m/s or 8.95 miles per hour (mph)), then the motion classifier 118 can confidently classify the object 112 as moving. In this way, computational power can be conserved for fused detections that are safely deemed as moving. The clearly moving threshold can be adjusted based on the object type or driving environment as well.

For fused detections below the clearly moving threshold, the motion classifier 118 can determine if the radar data 402 indicates that the fused detection is moving using the motion threshold and the perpendicular motion threshold from operation 414. If the object is determined to be moving, a moving flag 432 (e.g., "f_moving") is set as true. For pedestrians and other VRUs that have a true or positive value for the consecutive motion flag 426 and the consecutive perpendicular motion flag 428, the motion classifier 118 sets the moving flag 432 as true if the corresponding motion threshold and perpendicular motion thresholds are also satisfied. The additional constraints or checks for VRUs help to reduce incorrect motion classifications for such objects.

If the motion classifier 118 cannot perform the motion classification using the radar data 402 for a fused detection for a particular data cycle, then the motion classifier 118 can use the vision data 412 to perform motion classification. The motion classifier 118 can ensure the vision data 412 is accurate by using it only if the difference between the velocity determined from the vision data 412 is less than 3 m/s (or some other threshold value) in both the longitudinal and lateral directions. The vision data 412 can be used to update the consecutive motion counter 408 and the consecutive ambiguity counter 410. In addition, the motion classifier 118 can use the vision data 412 to recompute the consecutive motion flag 426 to determine if the moving flag 432 should be set as true for the fused detection.

If the motion classification using the radar data 402 or the vision data 412 cannot be performed, the motion classifier 118 can retain the value of the moving flag 432 from the previous data cycle. This scenario can occur when updated sensor data is not available for a particular data cycle.

If the moving flag 432 is updated for a fused detection in a particular data cycle, the motion classifier 118 can also update a stationary flag, moveable flag, fast-moving flag, slow-moving flag, oncoming flag, oncomeable flag, receding flag, and recedable flag for the fused detection. The update of these other motion flags ensures consistency across the motion flags. The motion classifier 118 can use a threshold of 7.5 m/s to differentiate between fast-moving and slow-moving objects, regardless of the object type. The stationary flag can be set as true if the consecutive motion counter 408 is equal to zero and the fused detection has a speed lower than the corresponding threshold. If the stationary flag is not true, then the movable flag is set to true. The moveable flag represents a historical version of the moving flag 432 and defines whether a particular object has ever been classified as moving. The oncoming flag is set as true if the fused detection indicates that the particular object 112 is moving away from the vehicle 102. The receding flag is set as true if the fused detection indicates that the particular object 112 is moving towards the vehicle 102. Similar to the movable flag, the oncomeable flag and the recedable flag are historical versions of the oncoming flag and the receding flag, respectively.

At operation 434, the motion classifier 118 can determine whether to increment historical motion counters for each fused detection. For example, if the moving flag is set as true for a fused detection, then a consecutive any motion counter 436 for the particular object 112 is incremented by one. The consecutive any motion counter 436 represents the number of data cycles in which a particular fused detection has had the moving flag 432 activated or set as true.

The motion classifier 118 can also update a consecutive any motion ever counter 438 based on the value of the consecutive any motion counter 436. In particular, the consecutive any motion ever counter 438 represents the maximum value of the consecutive any motion counter 436 for a particular fused detection and can be used to determine potentially incorrect moveable classifications as described in relation to operation 440. The motion classifier 118 stores the historical values of the consecutive any motion counter 436 and the consecutive any motion ever counter 438 for each object 112.

At operation 440, the motion classifier 118 determines whether to correct for stale information among the flags and/or counters. For example, the motion classifier 118 can determine whether to reset the moveable flag, the oncoming flag, and the receding flag. If a particular object 112 is a recent fused detection (e.g., it has been detected for less than ten data cycles), more than 150 meters out with a maximum observed speed lower than 2.5 m/s, and the value for the consecutive any motion counter is less than ten, then the moveable flag, the oncomeable flag, and the recedable flag are reset to zero. Other cycle, distance, and speed thresholds can be used to determine whether to reset these flags. An exception to resetting these flags is made for VRUs considering the challenges surrounding their motion classification.

At operation 442, the heading classifier 120 can determine heading classification for the fused detections. The heading classifier 120 can classify the heading based on the detected heading of the fused detections. The heading sectors can be defined by the heading classifier 120 into a north, northeast, east, southeast, south, southwest, west, and northwest heading. If a heading classification is set as either east or west for a fused detection, the heading classifier 120 can set a crossing flag 444 (e.g., "f_crossing") as true for the particular object 112. The crossing flag 444 can be provided to vehicle-based systems 208 to improve decision-making related to straight-cross path scenarios.

Example Motion Classifications

Figures 1, 5:
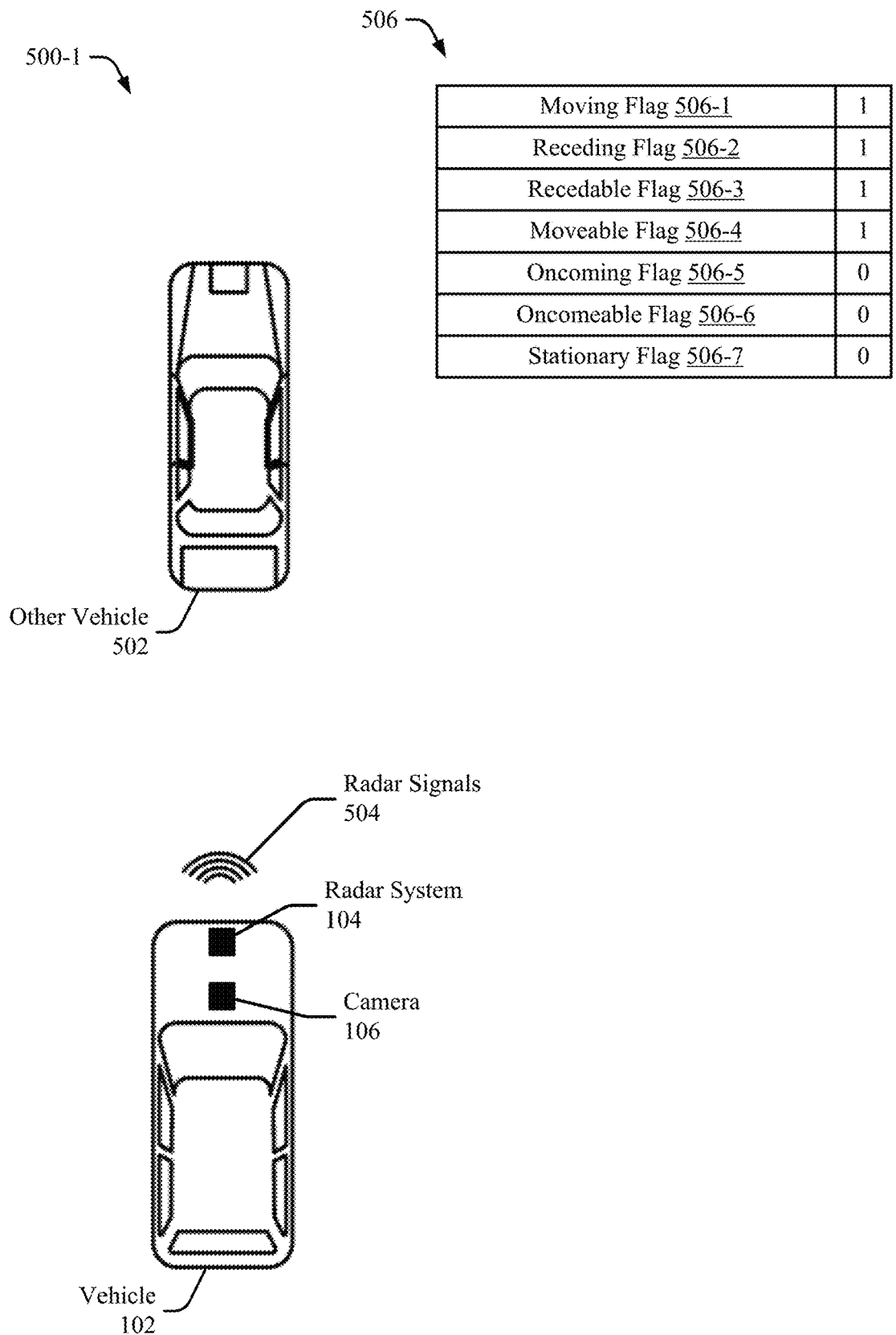

FIGS. 5-1 and 5-2 illustrate conceptual diagrams 500-1 and 500-2, respectively, in which motion classification is performed using low-level detections. The conceptual diagrams 500-1 and 500-2 illustrate the motion classification process of the motion classifier 118 for two different driving scenarios. The conceptual diagrams 500-1 and 500-2 illustrate example motion flags 506 and 510 provided by the motion classifier 118 to the vehicle-based systems 208, but the motion flags 506 and 510 are not necessarily limited to this order or combination of flags. In other implementations, fewer or additional flags and counters can be provided to the vehicle-based systems 208 to improve operation of the vehicle 102.

In FIG. 5-1, the vehicle 102 is driving along a roadway and another vehicle 502 is driving in front of it. The vehicle 102 includes the radar system 104 and the camera 106 with respective fields-of-view that include the other vehicle 502. The radar system 104 can transmit radar signals 504 that are reflected by the other vehicle 502 and processed by the radar system 104 and/or the motion classifier 118.

The motion classifier 118 can perform a motion and heading classification process according to the conceptual diagram 400 and set corresponding values of the motion flag 506 for the other vehicle 502. In particular, the motion classifier 118 can set a moving flag 506-1 as true, which is represented by a value of "1" in FIG. 5-1. The moving flag 506-1 indicates that the other vehicle 502 is moving. Because the moving flag 506-1 is set as true, the motion classifier 118 sets a stationary flag 506-7 as false, which is represented by a value of "0" in FIG. 5-1. In addition, because the moving flag 506-1 was set as true in this data cycle or in a previous data cycle, a moveable flag 506-4 is also set as true. The radar system 104 or the motion classifier 118 also determines that the other vehicle 502 is moving away from the vehicle 102 and sets a receding flag 506-2 as true. Because the receding flag 506-2 was set as true in this data cycle or in a previous data cycle, a recedable flag 506-3 is also set as true. Because the other vehicle 502 is moving away from the vehicle 102, the motion classifier 118 sets an oncoming flag 506-5 as false. Similar to the recedable flag 506-3, the motion classifier 118 also sets an oncomeable flag 506-6 as false because the oncoming flag 506-5 has not been true for this data cycle or a previous data cycle.

In FIG. 5-2, the vehicle 102 is driving along a roadway and a pedestrian 508 is crossing the roadway in front of it. The radar system 104 can transmit the radar signals 504 that are reflected by the pedestrian 508 and processed by the radar system 104 and/or the motion classifier 118.

The motion classifier 118 can perform a motion and heading classification process according to the conceptual diagram 400 and set corresponding values of the motion flag 510 for the pedestrian 508. In particular, the motion classifier 118 can set a moving flag 510-1 as true. The moving flag 506-1 indicates that the pedestrian 508 is moving (e.g., perpendicular to the vehicle 102). Because the moving flag 506-1 is set as true, the motion classifier 118 sets a stationary flag 510-7 as false. In addition, because the moving flag 506-1 was set as true in this data cycle or in a previous data cycle, a moveable flag 510-4 is also set as true. The radar system 104 or the motion classifier 118 also determines that the pedestrian 508 is moving towards the vehicle 102 and sets an oncoming flag 510-5 as true. Because the oncoming flag 510-5 was set as true in this data cycle or in a previous data cycle, an oncomeable flag 510-6 is also set as true. Because the pedestrian 508 is moving towards the vehicle 102, the motion classifier 118 also sets a receding flag 510-2 as false. Similar to the oncomeable flag 510-6, the motion classifier 118 also sets a recedable flag 510-3 as false because the receding flag 510-2 has not been true for this data cycle or a previous data cycle.

Example Motion Classifications

Some examples are described below.

Example 1. A method comprising: obtaining, from a radar system for a data cycle, radar signals reflected by one or more objects in a vicinity of a host vehicle; identifying, using the radar signals, one or more detections associated with each of the one or more objects, the one or more detections associated with a particular object of the one or more objects representing a fused detection for the particular object; determining, for each fused detection, whether the fused detection indicates that the particular object is moving; in response to determining that the fused detection indicates that the particular object is moving, incrementing a consecutive motion counter associated with the particular object; in response to determining that the consecutive motion counter associated with the particular object has a value greater than a threshold counter value, setting a consecutive motion flag associated with the particular object as true; setting a moving flag associated with the particular object as true if the consecutive motion flag associated with the particular object is set as true and the fused detection associated with the particular object has a velocity component greater than a motion threshold; in response to setting the moving flag associated with the particular object as true, incrementing a historical motion counter associated with the particular object; and operating, based on a status of the moving flag and the historical motion counter associated with each of the one or more objects, the host vehicle in a roadway.

Example 2. The method of Example 1, the method further comprises: determining, for each fused detection, whether the fused detection indicates that the particular object is moving perpendicular to the host vehicle; in response to determining that the fused detection indicates that the particular object is moving perpendicular to the host vehicle, incrementing a consecutive perpendicular motion counter associated with the particular object; in response to determining that the consecutive perpendicular motion counter has a value greater than the threshold counter value, setting a consecutive perpendicular motion flag associated with the particular object as true; setting the moving flag associated with the particular object as true if the consecutive perpendicular motion flag associated with the particular object is set as true and the fused detection associated with the particular object has an orthogonal velocity component greater than a perpendicular motion threshold; in response to setting the moving flag associated with the particular object as true, determining, from a heading associated with the fused detection, a heading classification associated with the particular object; setting a crossing flag as true if the heading classification associated with the particular object is set as perpendicular to the host vehicle; and operating, based on a status of the crossing flag associated with each of the one or more objects, the host vehicle in the roadway.

Example 3. The method of Example 2, wherein determining that the fused detection indicates that the particular object is moving perpendicular to the host vehicle comprises determining that the orthogonal velocity component associated with the fused detection is greater than zero.

Example 4. The method of Example 3, the method further comprises: in response to determining that the orthogonal velocity component associated with the fused detection is not greater than zero, reducing a value of the consecutive perpendicular motion counter associated with the particular object by one.

Example 5. The method of any of Example 2 through 4, the method further comprises: determining, for each fused detection and using vision data from one or more cameras of the host vehicle, an object type of the particular object; and setting the perpendicular motion threshold associated with the particular object based on the object type of the particular object.

Example 6. The method of Example 5, wherein determining that the orthogonal velocity component of the fused detection is greater than the perpendicular motion threshold comprises: determining that a first orthogonal velocity component of the fused detection based on the radar signals is greater than the perpendicular motion threshold; or determining that a second orthogonal velocity component of the fused detection based on the vision data is greater than the perpendicular motion threshold.

Example 7. The method of any of the preceding Examples, wherein determining whether the fused detection indicates that the particular object is moving comprises: determining that the particular object is moving if at least half of the one or more detections associated with the particular object indicate movement of the particular object; and determining that the movement of the particular object is ambiguous if less than half of the one or more detections associated with the particular object indicate movement.

Example 8. The method of Example 7, the method further comprises: in response to determining that the fused detection indicates that the movement of the particular object is ambiguous, incrementing a consecutive ambiguity counter associated with the particular object; in response to incrementing the consecutive ambiguity counter associated with the particular object, resetting a value of the consecutive motion counter associated with the particular object to zero; or in response to incrementing the consecutive motion counter associated with the particular object, resetting a value of the consecutive ambiguity counter associated with the particular object to zero.

Example 9. The method of any of the preceding Examples, wherein the threshold counter value is three.

Example 10. The method of any of the preceding Examples, the method further comprises: determining whether the fused detection associated with the particular object has a longitudinal velocity component greater than the motion threshold by: determining, for each fused detection and using vision data from one or more cameras of the host vehicle, an object type of the particular object; setting the motion threshold based on the object type of the particular object; and comparing the longitudinal velocity component associated with the particular object to the motion threshold.

Example 11. The method of Example 10, wherein comparing the longitudinal velocity component associated with the particular object to the motion threshold comprises: comparing a first longitudinal velocity component associated with the particular object to the motion threshold, the first longitudinal velocity component obtained from the radar signals; comparing a second longitudinal velocity component associated with the particular object to the motion threshold, the second longitudinal velocity component obtained from the vision data; or using a previous state of the moving flag associated with the particular object determined during a previous data cycle.

Example 12. The method of Example 10 or 11, determining whether the longitudinal velocity component of the fused detection associated with the particular object is greater than the motion threshold comprises determining whether the longitudinal velocity component is greater than a clearly moving threshold.

Example 13. The method of any of the preceding Examples, the method further comprises: in response to setting the moving flag associated with the particular object as true, setting a moveable flag associated with the particular object as true, the moveable flag associated with the particular object represents whether the moving flag associated with the particular object has been set as true in the data cycle or any previous data cycle; operating, based on a status of the moveable flag associated with each of the one or more objects, the host vehicle in the roadway; and resetting the moveable flag associated with the particular object to false if the historical motion counter associated with the particular object has a value less than ten.

Example 14. A system comprising: a radar system configured to receive radar signals reflected by one or more objects in a vicinity of a host vehicle for a data cycle; a processor configured to perform the method of any of the preceding Examples.

Example 15. A computer-readable storage media comprising computer-executable instructions that, when executed by a processor, cause the processor to perform the method of any of Examples 1 through 13.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
obtaining, from a radar system for a data cycle, radar signals reflected by one or more objects in a vicinity of a host vehicle;
identifying, using the radar signals, one or more detections associated with each of the one or more objects, the one or more detections associated with a particular object of the one or more objects representing a fused detection for the particular object;
determining, for each fused detection, whether the fused detection indicates that the particular object is moving;
in response to determining that the fused detection indicates that the particular object is moving, incrementing a consecutive motion counter associated with the particular object;
in response to determining that the consecutive motion counter associated with the particular object has a value greater than a threshold counter value, setting a consecutive motion flag associated with the particular object as true;
determining whether the fused detection associated with the particular object has a longitudinal velocity component greater than a motion threshold by: (i) determining, for each fused detection and using vision data from one or more cameras of the host vehicle, an object type of the particular object; (ii) setting the motion threshold based on the object type of the particular object; and (iii) comparing the longitudinal velocity component associated with the particular object to the motion threshold;
setting a moving flag associated with the particular object as true if the consecutive motion flag associated with the particular object is set as true and the longitudinal velocity component of the fused detection associated with the particular object has a velocity component that is greater than the motion threshold;

in response to setting the moving flag associated with the particular object as true, incrementing a historical motion counter associated with the particular object; and operating, based on a status of the moving flag and the historical motion counter associated with each of the one or more objects, the host vehicle in a roadway.

2. The method of claim 1, the method further comprises:

determining, for each fused detection, whether the fused detection indicates that the particular object is moving perpendicular to the host vehicle;

in response to determining that the fused detection indicates that the particular object is moving perpendicular to the host vehicle, incrementing a consecutive perpendicular motion counter associated with the particular object;

in response to determining that the consecutive perpendicular motion counter has a value greater than the threshold counter value, setting a consecutive perpendicular motion flag associated with the particular object as true;

setting the moving flag associated with the particular object as true if the consecutive perpendicular motion flag associated with the particular object is set as true and the fused detection associated with the particular object has an orthogonal velocity component greater than a perpendicular motion threshold;

in response to setting the moving flag associated with the particular object as true, determining, from a heading associated with the fused detection, a heading classification associated with the particular object;

setting a crossing flag as true if the heading classification associated with the particular object is set as perpendicular to the host vehicle; and operating, based on a status of the crossing flag associated with each of the one or more objects, the host vehicle in the roadway.

3. The method of claim 2, wherein determining that the fused detection indicates that the particular object is moving perpendicular to the host vehicle comprises determining that the orthogonal velocity component associated with the fused detection is greater than zero.

4. The method of claim 3, the method further comprises:

in response to determining that the orthogonal velocity component associated with the fused detection is not greater than zero, reducing a value of the consecutive perpendicular motion counter associated with the particular object by one.

5. The method of claim 2, the method further comprises:

determining, for each fused detection and using vision data from one or more cameras of the host vehicle, an object type of the particular object; and setting the perpendicular motion threshold associated with the particular object based on the object type of the particular object.

6. The method of claim 5, wherein determining that the orthogonal velocity component of the fused detection is greater than the perpendicular motion threshold comprises:

determining that a first orthogonal velocity component of the fused detection based on the radar signals is greater than the perpendicular motion threshold; or determining that a second orthogonal velocity component of the fused detection based on the vision data is greater than the perpendicular motion threshold.

7. The method of claim 1, wherein determining whether the fused detection indicates that the particular object is moving comprises:

determining that the particular object is moving if at least half of the one or more detections associated with the particular object indicate movement of the particular object; and determining that the movement of the particular object is ambiguous if less than half of the one or more detections associated with the particular object indicate movement.

8. The method of claim 7, the method further comprises:

in response to determining that the fused detection indicates that the movement of the particular object is ambiguous, incrementing a consecutive ambiguity counter associated with the particular object;

in response to incrementing the consecutive ambiguity counter associated with the particular object, resetting a value of the consecutive motion counter associated with the particular object to zero; or in response to incrementing the consecutive motion counter associated with the particular object, resetting a value of the consecutive ambiguity counter associated with the particular object to zero.

9. The method of claim 1, wherein the threshold counter value is three.

10. The method of claim 1, wherein comparing the longitudinal velocity component associated with the particular object to the motion threshold comprises:

comparing a first longitudinal velocity component associated with the particular object to the motion threshold, the first longitudinal velocity component obtained from the radar signals;

comparing a second longitudinal velocity component associated with the particular object to the motion threshold, the second longitudinal velocity component obtained from the vision data; or using a previous state of the moving flag associated with the particular object determined during a previous data cycle.

11. The method of claim 1, wherein determining whether the longitudinal velocity component of the fused detection associated with the particular object is greater than the motion threshold comprises determining whether the longitudinal velocity component is greater than a clearly moving threshold.

12. The method of claim 1, the method further comprises:

in response to setting the moving flag associated with the particular object as true, setting a moveable flag associated with the particular object as true, the moveable flag associated with the particular object represents whether the moving flag associated with the particular object has been set as true in the data cycle or any previous data cycle;

operating, based on a status of the moveable flag associated with each of the one or more objects, the host vehicle in the roadway; and resetting the moveable flag associated with the particular object to false if the historical motion counter associated with the particular object has a value less than ten.

13. A system comprising:

a radar system configured to receive radar signals reflected by one or more objects in a vicinity of a host vehicle for a data cycle;

a processor configured to:
  identify, using the radar signals, one or more detections associated with each of the one or more objects, the one or more detections associated with a particular object of the one or more objects representing a fused detection for the particular object;
  determine, for each fused detection, whether the fused detection indicates that the particular object is moving;
  in response to determining that the fused detection indicates that the particular object is moving, increment a consecutive motion counter associated with the particular object;
  in response to determining that the consecutive motion counter associated with the particular object has a value greater than a threshold counter value, set a consecutive motion flag associated with the particular object as true;
  determine whether the fused detection associated with the particular object has a longitudinal velocity component greater than a motion threshold by: (i) determining, for each fused detection and using vision data from one or more cameras of the host vehicle, an object type of the particular object; (ii) setting the motion threshold based on the object type of the particular object; and (iii) comparing the longitudinal velocity component associated with the particular object to the motion threshold;
  set a moving flag associated with the particular object as true if the consecutive motion flag associated with the particular object is set as true and the longitudinal velocity component of the fused detection associated with the particular object has a velocity component that is greater than the motion threshold;
  in response to setting the moving flag associated with the particular object as true, increment a historical motion counter associated with the particular object; and
  operate, based on a status of the moving flag and the historical motion counter associated with each of the one or more objects, the host vehicle in a roadway.

14. The system of claim 13, wherein the processor is further configured to:
  determine, for each fused detection, whether the fused detection indicates that the particular object is moving perpendicular to the host vehicle;
  in response to determining that the fused detection indicates that the particular object is moving perpendicular to the host vehicle, increment a consecutive perpendicular motion counter associated with the particular object;
  in response to determining that the consecutive perpendicular motion counter has a value greater than the threshold counter value, set a consecutive perpendicular motion flag associated with the particular object as true;
  set the moving flag associated with the particular object as true if the consecutive perpendicular motion flag associated with the particular object is set as true and the fused detection associated with the particular object has an orthogonal velocity component greater than a perpendicular motion threshold;
  in response to setting the moving flag associated with the particular object as true, determine, from a heading associated with the fused detection, a heading classification associated with the particular object;
  set a crossing flag as true if the heading classification associated with the particular object is set as perpendicular to the host vehicle; and
  operate, based on a status of the crossing flag associated with each of the one or more objects, the host vehicle in the roadway.

15. The system of claim 14, wherein the processor is further configured to:
  determine that the fused detection indicates that the particular object is moving perpendicular to the host vehicle by determining that the orthogonal velocity component associated with the fused detection is greater than zero; and
  in response to determining that the orthogonal velocity component associated with the fused detection is not greater than zero, reduce a value of the consecutive perpendicular motion counter associated with the particular object by one.

16. The system of claim 14, wherein:
  the system further comprises one or more cameras configured to capture vision data of the one or more objects in the vicinity of the host vehicle; and
  the processor is further configured to:
    determine, for each fused detection and using the vision data, an object type of the particular object; and
    set the perpendicular motion threshold associated with the particular object based on the object type of the particular object.

17. The system of claim 13, wherein the processor is configured to compare the longitudinal velocity component associated with the particular object to the motion threshold by:
  comparing a first longitudinal velocity component associated with the particular object to the motion threshold, the first longitudinal velocity component obtained from the radar signals;
  comparing a second longitudinal velocity component associated with the particular object to the motion threshold, the second longitudinal velocity component obtained from the vision data; or
  using a previous state of the moving flag associated with the particular object determined during a previous data cycle.

18. A non-transitory computer-readable storage media comprising computer-executable instructions that, when executed by a processor, cause the processor to:
  obtain, from a radar system for a data cycle, radar signals reflected by one or more objects in a vicinity of a host vehicle;
  identify, using the radar signals, one or more detections associated with each of the one or more objects, the one or more detections associated with a particular object of the one or more objects representing a fused detection for the particular object;
  determine, for each fused detection, whether the fused detection indicates that the particular object is moving;
  in response to determining that the fused detection indicates that the particular object is moving, increment a consecutive motion counter associated with the particular object;
  in response to determining that the consecutive motion counter associated with the particular object has a value greater than a threshold counter value, set a consecutive motion flag associated with the particular object as true;
  determine whether the fused detection associated with the particular object has a longitudinal velocity component greater than a motion threshold by: (i) determining, for each fused detection and using vision data from one or more cameras of the host vehicle, an object type of the particular object; (ii) setting the motion threshold based on the object type of the particular object; and (iii) comparing the longitudinal velocity component associated with the particular object to the motion threshold;

set a moving flag associated with the particular object as true if the consecutive motion flag associated with the particular object is set as true and the longitudinal velocity component of the fused detection associated with the particular object has a velocity component that is greater than the motion threshold;

in response to setting the moving flag associated with the particular object as true, increment a historical motion counter associated with the particular object; and operate, based on a status of the moving flag and the historical motion counter associated with each of the one or more objects, the host vehicle in a roadway.

* * * * *